UNITED STATES PATENT OFFICE.

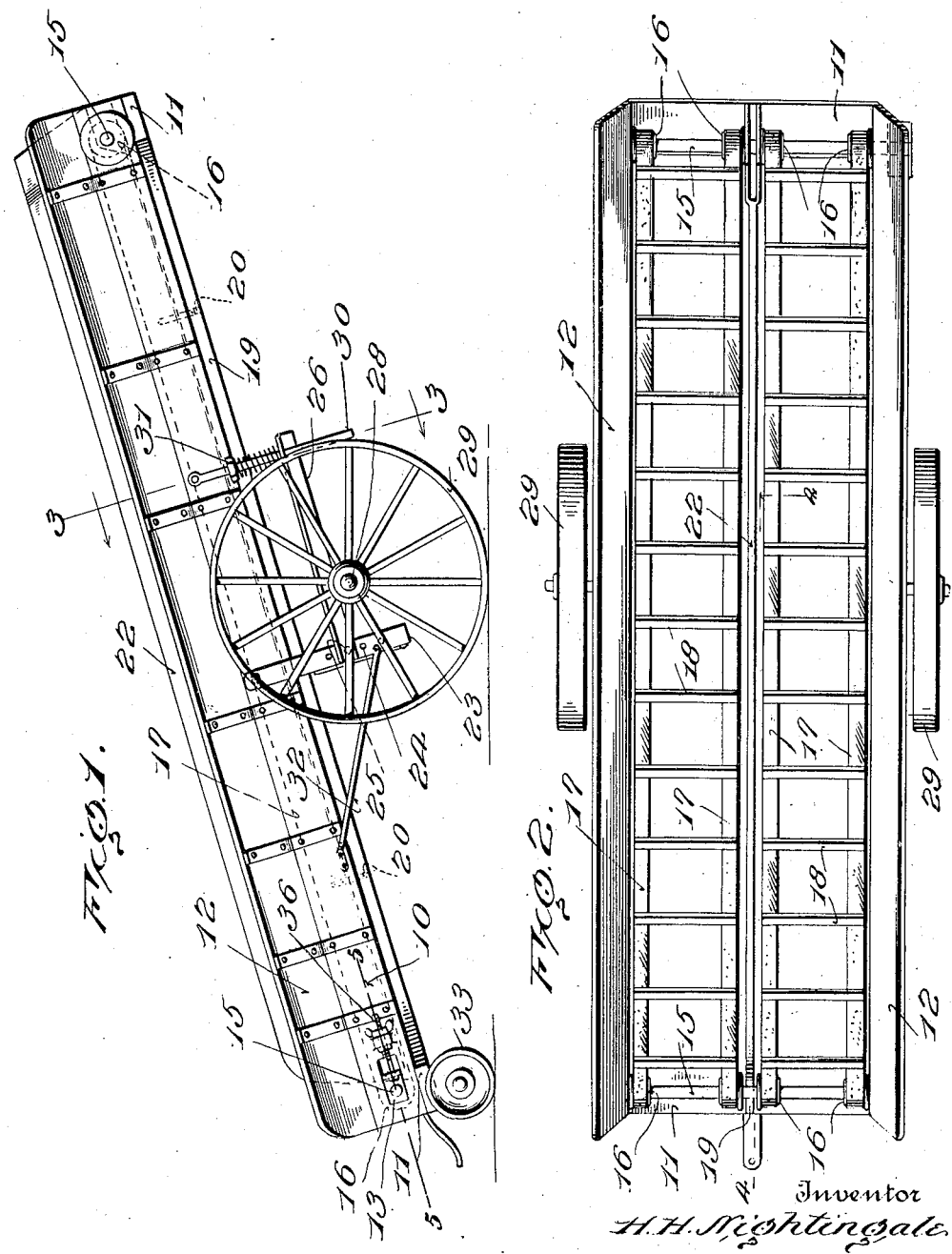

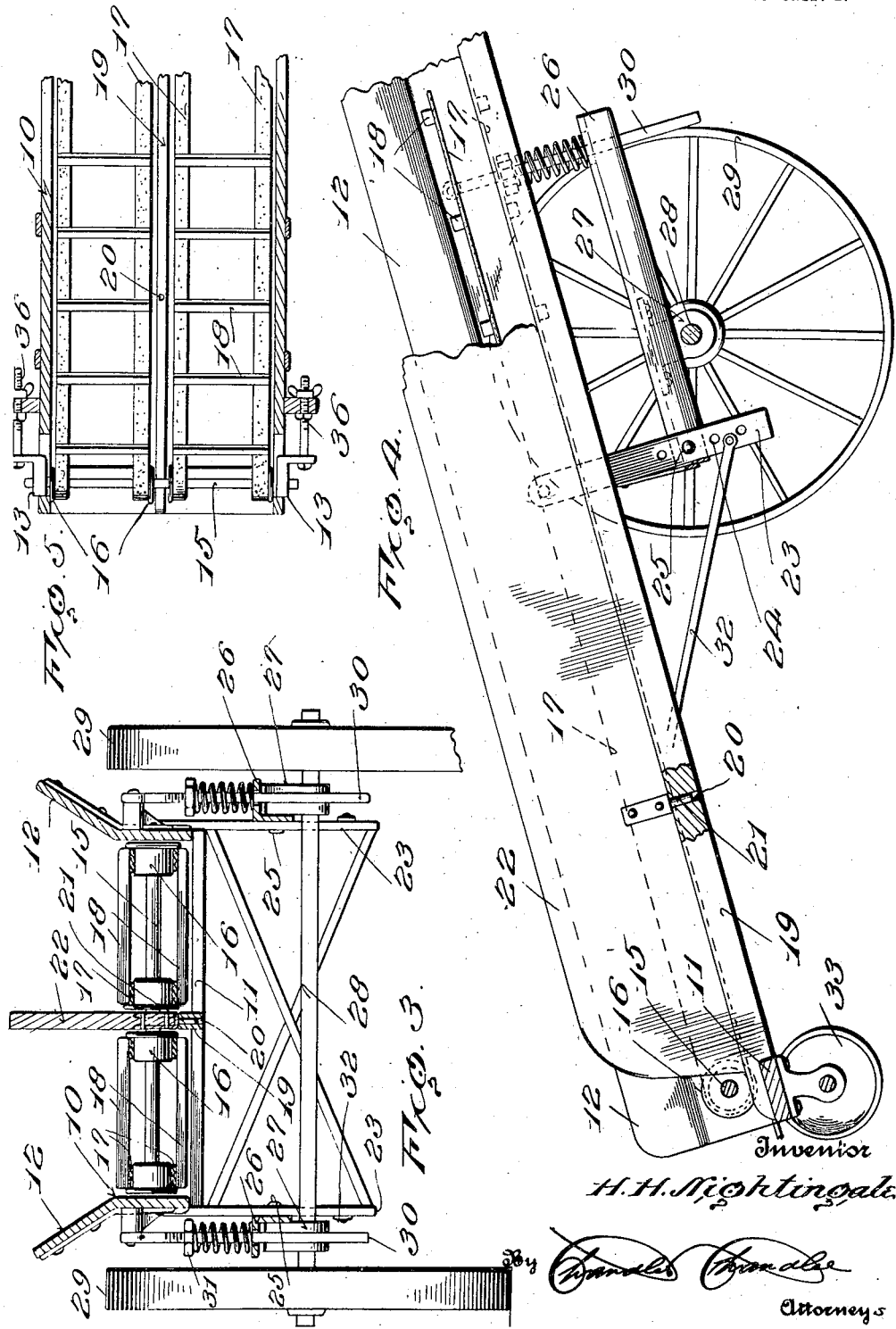

HENRY H. NIGHTINGALE, OF GREENSBURG, KANSAS.

EXTENSION-FEEDER.

1,356,733.  Specification of Letters Patent.  Patented Oct. 26, 1920.

Application filed May 23, 1919. Serial No. 299,190.

*To all whom it may concern:*

Be it known that I, HENRY H. NIGHTINGALE, a citizen of the United States, residing at Greensburg, in the county of Kiowa, State of Kansas, have invented certain new and useful Improvements in Extension-Feeders; and I do hereby declare the following to be a full, clear, and exact description of the invention, such as will enable others skilled in the art to which it appertains to make and use the same.

This invention relates to new and useful improvements in feeding devices and particularly to feeding devices for threshing machines.

One object of the present invention is to provide a novel and improved construction of devices which are attached to the feeding end of threshing machines which permit the sheaves to be carried from a position close to the ground instead of having to lift them to the feed board or table of the threshing machine.

Another object is to provide a novel and improved device of this character which is readily capable of being adjusted to different heights to permit the extension feeder to be easily and quickly coupled to the threshing machine.

Other objects and advantages will be apparent from the following description when taken in connection with the accompanying drawings.

In the drawings:

Figure 1 is a side elevation of the extension feeder.

Fig. 2 is a top plan view of the same.

Fig. 3 is a vertical transverse sectional view taken on the line 3—3 of Fig. 1, showing the arrangement of the belts and the means for adjusting the height of the device with respect to the feed table of the threshing machine.

Fig. 4 is an enlarged vertical longitudinal section on the line 4—4 of Fig. 2, showing means for adjusting the height of the delivery end of the feeding device.

Fig. 5 is a horizontal longitudinal sectional view taken on the line 5—5 of Fig. 2, showing the conveyer belt and the adjusting means.

Referring particularly to the accompanying drawings, there is shown a trough-like structure or chute including the frame 10, braced in spaced parallel relation by the members 11, and the upwardly and outwardly inclining side boards 12. Extending transversely in each end of the chute, and having their ends journaled in brackets 13, carried by the sides of the frame 10, are the shafts 15. Mounted on these shafts are the pulleys 16 around which travel the endless belts 17, said belts being connected in pairs by the transverse strips 18. Thus, as constituted, there are two conveyer belts. A member 19, of the frame, extends longitudinally between the conveyer belts and has the sockets 20 in its upper edge face for the reception of the pins 21, carried by the lower edge face of the division board 22, which is placed between the belts to assist in guiding the bundles or sheaves up the chute and to prevent sidewise or lateral movement of either end of any of the bundles or sheaves.

Secured to the opposite sides of the frame are the depending flat metal strips 23 constituting hangers, each being formed with a longitudinal series of openings 24 for the selective reception of a bolt or pin 25 carried by one end of a horizontal angle iron member 26. The intermediate portion of each of these members 26 carries a clip 27 which secures the axle 28 thereto. This axle carries the ground wheels 29 for supporting the device, and for permitting easy and quick movement from place to place. Depending from each side of the frame is a bolt or rod 30 which slidably passes through a hole in the upper leaf of the angle iron member 26 as seen in Fig. 3. On the rod between a nut 31 carried thereby and the member 26, is a coil spring which resiliently supports the weight of the device, as will be readily understood. A brace 32 extends from the first-named end of each of the members 26 to the side of the frame to act as a means for holding the hanger 23 and the axle in proper position.

It will be noted that the axle is disposed at one side of the longitudinal center of the chute, and carried by the end of the longer and heavier portion are the small ground engaging wheels 33, while the end of the other portion may be connected with the threshing machine to hold the device in proper position with respect thereto.

The brackets 13 are adjustable by means of the screws 36 to regulate the tension of the belts.

The bolt or pin 25 is capable of being engaged through any one of the openings 24 whereby the frame may be adjusted vertically with respect to the axle. When the pin 25 has been placed in the proper opening 24 the nut 31 on bolt or rod 30 is turned to swing the end of the member 26 upwardly or downwardly, whereby the chute will be adjusted vertically to the proper height to engage it with the feed end of the threshing machine.

When the device is used for feeding loose or unshocked grain, the division board is removed, and thus the grain will travel upwardly on both of the belts. The use of the division board serves to hold the bundles or sheaves in proper position so that they will travel longitudinally, thus facilitating the cutting of the bands thereof by the band cutter of the threshing machine.

What is claimed is:

In a feeder for threshers, the combination with a trough-like frame, and a conveyer therein; of an axle mounted on ground wheels, angle-irons secured across said axle and each having an opening in its upright leaf at one end and an opening in its horizontal leaf at the other end, a hanger depending from each side of the frame and having a series of openings, a pin for engaging any of them and the first-named opening in the angle-iron, a bolt depending from each side of the frame and passing through the remaining opening in the angle-iron, a spring on this bolt above the angle-iron, and an adjusting nut on the bolt above the spring.

In testimony whereof I affix my signature in the presence of two witnesses.

HENRY H. NIGHTINGALE.

Witnesses:
E. A. NORTHRUP,
KATHERINE WEIR.